-6-975
3/24/87 RE 32,377

United States Patent [19]

Seyerle

[11] E Patent Number: Re. 32,377

[45] Reissued Date of Patent: Mar. 24, 1987

[54] CUTTER BLADE FOR PNEUMATICALLY TRANSPORTING GRASS CLIPPINGS

[75] Inventor: Carl E. Seyerle, Cordova, Tenn.

[73] Assignee: Outboard Marine Corporation, Waukegan, Ill.

[21] Appl. No.: 854,939

[22] Filed: Apr. 23, 1986

Related U.S. Patent Documents

Reissue of:

[64] Patent No.: 4,559,769
Issued: Dec. 24, 1985
Appl. No.: 402,102
Filed: Jul. 26, 1982

[51] Int. Cl.[4] ..... A01D 34/67

[52] U.S. Cl. ..... 56/295; 56/13.4

[58] Field of Search ..... 56/295, 13.4

[56] References Cited

U.S. PATENT DOCUMENTS

| | | | |
|---|---|---|---|
| 1,656,105 | 1/1928 | Durkee | 56/295 |
| 2,969,634 | 1/1961 | Lannert | 56/295 |
| 3,762,138 | 10/1973 | Michael | 56/295 |
| 4,062,171 | 12/1977 | Rose | 56/295 |
| 4,129,977 | 12/1978 | Comer | 56/295 |
| 4,149,358 | 4/1979 | Comer | 56/295 |
| 4,306,407 | 12/1981 | Dambroth | 56/295 |

FOREIGN PATENT DOCUMENTS

| | | | |
|---|---|---|---|
| 2800546 | 7/1978 | Fed. Rep. of Germany | 56/295 |

*Primary Examiner*—Paul J. Hirsch
*Attorney, Agent, or Firm*—Michael, Best & Freidrich

[57] ABSTRACT

Disclosed herein is a cutter blade for a rotary lawn mower, which cutter blade is generally of elongated rectangular outline and includes a leading edge, a trailing edge, a longitudinal axis extending lengthwise between the leading and trailing edges, a generally planar outer end portion including a cutting edge forming a part of the leading edge and an outer tip, and a sail portion extending from outer end portion along a form line extending between the outer tip and the trailing edge at a form angle within the range of 25 degrees to 35 degrees to the longitudinal axis. The sail portion also has an upper edge which is spaced above a horizontal plane containing the cutting edge at a height of between 0.65 inches and 0.75 inches and which extends continuously concavely arcuately outwardly and upwardly from the form line at a uniform radius between 1.00 inches and 1.40 inches measured in a plane perpendicular to the form line.

32 Claims, 4 Drawing Figures

CUTTER BLADE FOR PNEUMATICALLY TRANSPORTING GRASS CLIPPINGS

Matter enclosed in heavy brackets [ ] appears in the original patent but forms no part of this reissue specification; matter printed in italics indicates the additions made by reissue.

BACKGROUND OF THE INVENTION

The invention relates generally to rotary lawn mowers and to cutter blades for rotary lawn mowers. The invention further relates to rotary mowers which discharge the grass clippings or which mulch the grass clippings. Still more particularly, the invention relates to rotary cutter blades which are driven at rotary speeds which produce tip speeds of between 14,000 fpm and 19,000 fpm.

In conventional rotary mowers, the rotating cutter blade not only cuts the grass but agitates and moves air. Grass discharge and bagging characteristics are dependent on the air flow characteristics of the mower. To optimize these characteristics, the cutter blade and mower housing should cooperate with each other at the nominal speed of operation.

With conventional blade shape, wherein the sail portion is formed upwardly for a length which is essentially of uniform height and parallel to the longitudinal axis of the blade, the bulk of air is pumped forwardly or tangentially ahead of the blade in a high density airstream. Since that airstream impinges or strikes the circular wall or skirt of the housing, much of its energy and velocity is lost through fluid friction, resulting in wasted power. In addition, the cutter blade continuously shears its way through that high density airstream, wasting more power. As the cutter blade shears that airstream, noise is generated. The greater the density of the airstream, the greater the noise generated. Noise is a discordant type of sound power. That power is, also, wasted.

Attention is directed to the Comer U.S. Pat. Nos. 4,129,977 issued Dec. 19, 1978 and 4,149,358 issued Apr. 17, 1979. These patents are directed to cutter blades which are intended to operate at tip speeds below 14,000 fpm, which are designed to provide predominant mechanical transport and suspension rather than pneumatic transport and suspension, and which, when operated at or above 14,000 fpm, cause mower "blow-out" with entrained air (and clippings) being driven out or around the lower edges of the mower housing rather than being channeled into a bag. In addition, operation of the Comer cutter blades at such speeds is likely to result in undue turbulence within the housing and to interfere with orderly cutting and evacuation of the housing.

By contrast to the cutter blades of U.S. Pat. Nos. 4,129,977 and 4,149,358, the cutter blade described and claimed hereinafter is designed to provide pneumatic suspension and transport and does not cause "blow-out" at tip speeds within the range of 14,000 fpm to 19,000 fpm.

SUMMARY OF THE INVENTION

The invention provides a cutter blade for a rotary lawn mower, which cutter blade is generally of elongated rectangular outline and includes a leading edge, a trailing edge, a longitudinal axis extending lengthwise between the leading and trailing edges, a generally planar outer end portion including a cutting edge forming a part of the leading edge and an outer tip, and a sail portion extending from the outer end portion along a form line extending between the outer tip and the trailing edge at a form angle within the range of 25 degrees to 35 degrees to the longitudinal axis, which sail portion also has an upper edge spaced above a horizontal plane including the cutting edge at a height of between 0.65 inches and 0.75 inches, and which sail portion extends continuously concavely arcuately outwardly and upwardly from the form line.

In one embodiment of the invention, the form angle is 30 degrees.

In one embodiment of the invention, the sail portion extends concavely arcuately outwardly and upwardly from the form line at a uniform radius measured in a plane perpendicular to the form line.

In one embodiment of the invention, the radius is between 1.00 inches and 1.40 inches.

In one embodiment of the invention, the radius is 1.20 inches.

In one embodiment of the invention, the sail portion has a chord length of between 2.20 inches and 3.00 inches measured in a plane perpendicular to the longitudinal axis and from the leading edge to the sail upper edge.

In one embodiment of the invention, the sail portion has an angle of attack of between 13 degrees and 18 degrees measured in a plane perpendicular to the longitudinal axis and between a line in a horizontal plane containing the cutting edge and a line extending from the leading edge to the the upper edge.

The invention also provides a rotary lawn mower comprising a housing supported for travel over the ground and including a top deck and a depending skirt, an engine mounted on the top deck and including an output shaft extending vertically downwardly through the top deck, and a cutter blade located within the housing and driven by the output shaft, which cutter blade is as specified above and is driven with a tip speed of between 14,000 fpm and 19,000 fpm.

Other features and advantages of the embodiments of the invention will become known by reference to the following general description, claims and appended drawings.

IN THE DRAWINGS

Figure 1:
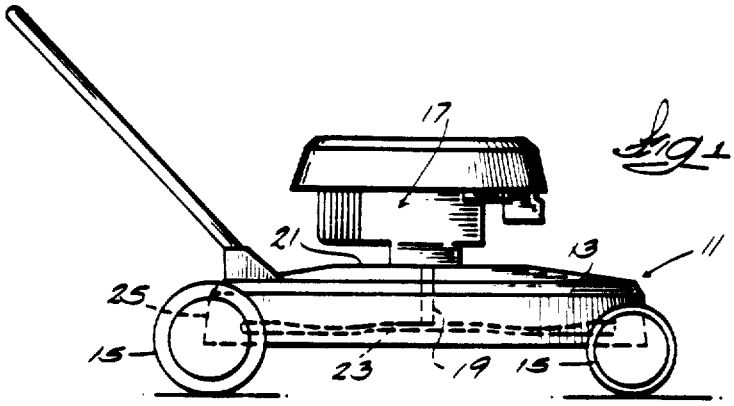
FIG. 1 is a side elevational view of a rotary lawn mower incorporating various of the features of the invention.
Figure 2:
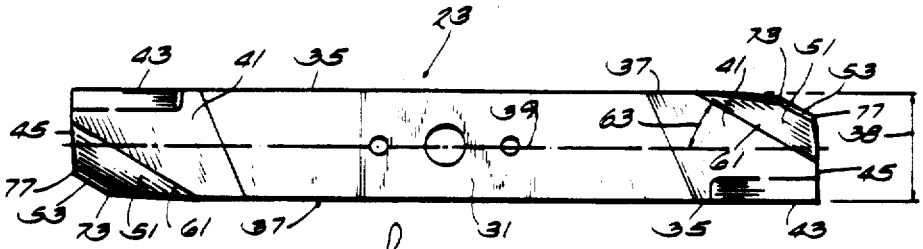
FIG. 2 is an enlarged plan view of the cutter blade incorporated in the lawn mower shown in FIG. 1.
Figure 3:
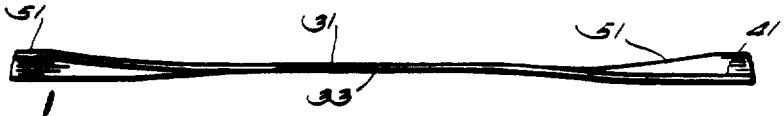
FIG. 3 is a side elevational view of the cutter blade shown in FIG. 2.
Figure 4:
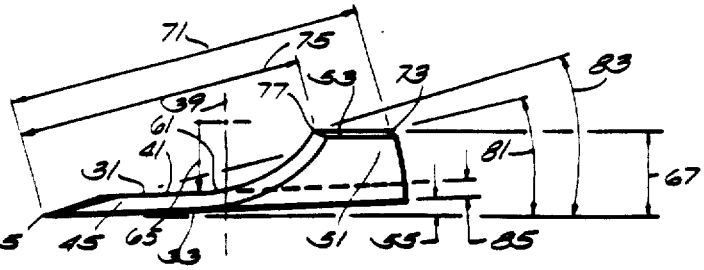
FIG. 4 is an enlarged end elevation view of the cutter blade shown in FIG. 2.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in the drawings is a rotary lawn mower 11 including a housing 13 which is supported on a plurality of wheels 15 and which supports an internal combustion engine 17. The engine 17 includes a crankshaft or output shaft 19 which extends downwardly through the top deck 21 of the housing 13 and which has mounted thereon a rotary cutter blade 23. The cutter blade 23 rotates generally horizontally within a skirt 25 extending downwardly from the housing top deck 21. Various arrangements can be employed to propel the housing over the ground and to discharge and/or collect grass clippings and/or to mulch the grass clippings. The engine 17 is governed to run at an operating speed such that the outer tip of the cutter blade 23 has a velocity of between 14,000 and 19,000 fpm, and preferably has a nominal operating speed of 16,500 fpm.

The cutter blade 23 is generally of elongated rectangular shape including an upper or top surface 31 and a lower or bottom surface 33, together with a leading edge 35, a trailing edge 37 extending in generally parallel spaced relation to the leading edge 35 at a distance or width 38, and a longitudinal axis 39 extending generally midway between the leading and trailing edges 35 and 37 and passing through the axis of rotation of the cutter blade 23. In addition, the cutter blade 23 includes opposite, generally planar end portions 41, each including a cutting edge 43 which forms part of the leading edge 35, and an outer tip or edge 45, and respective said portions 51 which extend from the outer end portions 41 and includes an upper edge 53. While the cutter blade 23 is mounted for rotation of the cutting edges 43 in a generally horizontal plane, the lower surfaces 33 of the outer end portions 41 extend at a clearance angle 55 of about 3° to the horizontal.

The cutter blade 23 is designed to pneumatically suspend and transport grass clippings at cutter blade tip speeds between 14,000 fpm and 19,000 fpm, and to cooperate with the housing so as to avoid excessive noise generation and power loss. As energy imparted to grass clippings will be very rapidly lost because the surface area of a grass clipping is very large relative to its mass, grass clippings will rapidly decelerate to the velocity of the airstream in which the clippings are entrained. Grass clipping transport is most effectively obtained by controlling the velocity of the airstream moved by the blade tip and by suspending or entraining the grass clippings in the airstream. The flow of air in an airstream can be regarded as a succession of slugs of air and the cutter blade 23 is designed to pneumatically suspend and transport or convey the grass clippings by imparting velocity to the airstream or air slug, which velocity is directed essentially forwardly, inwardly and upwardly relative to the outer blade tip.

Air has mass and therefore it also has inertia. In addition, air is very compressible and very elastic. As such, air is very resistant to abrupt changes in velocity and in direction. The resistance of air increases as the square of the blade velocity. For example, resistance of air to motion at a blade tip speed of 18,000 fpm is about 65% greater than 14,000 fpm.

As already noted, the cutter blade 23 is intended to operate at speeds from 14,000 fpm to 19,000 fpm with a nominal speed of about 16,500 fpm. At these speeds air is very resistant. It must be urged smoothly and gradually to accelerate from a comparatively low speed, i.e., 800 fpm, located inwardly of the sail portion 51 of the cutter blade 23 to the speed or velocity located at the outer blade tip 45.

The sail portion 51 of the cutter blade 23 is essentially an air foil and is affected by the properties of an air foil. The three critical properties of an air foil are chord height, chord length and angle of attack. A fourth property, aspect ratio, is defined as the sine of the angle of attact.

In order to obtain the desired pneumatic suspension and transport of grass clippings, the airstream should have, in addition to forward, inward, and upward linear velocity, angular velocity about a vertical axis and angular velocity about a horizontal axis.

In the disclosed construction, the vertical axis of angular velocity is coincident with the axis of cutter blade rotation and is clockwise in direction when viewed from above. The horizontal axis of angular velocity is parallel to a form line 61 still to be described, and is counter-clockwise when viewed from the outside of the mower housing 13.

To impart the desired angular velocities and the upward, inward, and forward linear velocities to the airstream, the form of the sail portion 51 of the cutter blade 23 must be executed smoothly and gradually. The before-mentioned principles of mass and inertia apply. If the airstream is accelerated too abruptly, the air will tumble over the sail portion 51 with an essentially downward and outward velocity. Such air will merge with the air rushing forwardly to fill the low pressure zone immediately trailing the sail porton 51 and will result in an airstream directed forwardly, outwardly and downwardly. Such an airstream will exit the mower housing and produce the phenomenon known as "blow-out".

In order to direct the airstream as indicated, at each cutter bar end, the sail portion 51 extends from the outer end portion 41 along a form line 61 extending in the plane of the upper surface 31 of the outer end portion 41 from the outer tip or edge 45 to the trailing edge 37 and at a form angle 63 which is within the range of 25° to 35° to the longitudinal axis 39 of the cutter blade 23. Preferably, the form angle 63 is 30°.

The sail 51 extends continuously concavely arcuately upwardly and outwardly from the form line 41 to the upper edge 53 which, preferably, is generally disposed in parallel relation to the form line 61 and is located at a height 67 above a horizontal plane including the cutting edges 43 of between 0.65 inches and 0.75 inches, and preferably about 0.70 inches. Preferably, the sail portion 51 extends at a uniform radius 65 measured in a plane perpendicular to and intersecting the form line 61. Preferably, the radius 65 is between 1.00 inches and 1.40 inches and, still more preferably, is 1.20 inches. As a consequence, the sail portion 51 comprises a segment of a cylinder when viewed in a direction parallel to the form line 61. In addition, the sail portion 51 presents to the airstream an arc of an ellipse which accomplishes smooth acceleration through an ever-decreasing radius continuously to the upper edge 53 of the sail portion 51.

While the form line 61 has been described as extending rectilinearly between the outer tip or edge 45 and the trailing edge 37 in the plane of the upper surface 31 of the outer end portion 41, the form line 41 is most effective when it is an arc of a circle with a radius approximately equal to the length of the cutter blade 23. For cutter blades having a length greater than 10 inches, the deviation of a straight line from the arc is functionally slight and is of little consequence.

The form angle 63 is critically speed dependent. Lower speeds require a shallower or lesser angle, while higher speeds are best served by steeper or greater angles. When operating within the speed range of from 14,000 fpm to 19,000 fpm, angles steeper or greater than 35° impart too much inward velocity, allowing the airstream to bypass the urging of the sail portion 51 and causing a roar-like noise. Angles lower or less than 25° impart to the airstream too little inward velocity, thereby dropping the airstream between the cutter blade 23 and the housing wall or skirt 25, where it is sheared. Such action creates both noise and drag.

Preferably, the sail portion 51 has a chord length of between 2.20 inches and 3.00 inches measured in a plane perpendicular to the longitudinal axis 39 and from the cutting edge 43 (or an extension thereof) to the sail upper edge 53. In the disclosed construction, the sail portion 51, coupled with the width 38 of the cutter blade 23, define an inner chord length 71 which extends between the cutting edge 43 and the inner end 73 of the sail upper edge 53 adjacent the trailing edge 37 and which is 3.00 inches long. In addition, the sail portion 51 and the cutter blade width 38 define an outer chord length 75 which extends between the cutting edge 43 and the outer end 77 of the sail upper edge 53 adjacent the outer tip or edge 45 and which is 2.20 inches long.

Preferably, when operating at speeds within the range of 14,000 fpm to 19,000 fpm, it is desirable that the sail portion 51 have an angle of attack of between 13° and 18° measured in a plane perpendicular to the longitudinal axis 39 and between the horizontal and a line extending from the cutting edge 43 to the said upper edge 53. In the disclosed construction, the sail portion 51 and the cutter blade width 38 provide an inner angle of attack 81 which is defined between the horizontal and a line extending from the cutting edge 43 to the inner end 73 of the sail upper edge 53 adjacent the trailing edge 37 and which is 13°. In addition, the sail portion 51 and the cutter blade width 38 define an outer angle of attach 83 which is defined between the horizontal and a line extending from the cutting edge 43 adjacent the outer tip or edge 45 and which is 18°.

In the disclosed cutter blade 23, the width 38 is about 3.0 inches and the longitudinal axis 39 is midway between the leading and trailing edges 35 and 37. In addition, the cutter blade has a nominal thickness 85 of 0.125 inches.

If the angle of attack is greater than 18°, the airstream is accelerated too rapidly and will not leave the cutter blade 23 but will tumble over the sail portion 51 and will produce a noise in the form of a roar, i.e., a low frequency, high intensity noise.

If the angle of attack is less than 13°, and the chord length is shorter than 2.20 inches, then the cutter blade 23 becomes a very inefficient air-moving device because the air is not accelerated to sufficient speed. Chord lengths greater than 3.00 inches with an angle of attack within the range of 13° to 18° will develop a high drag which produces a parasitic blade power loss.

It is again emphasized that the cutter blade 23 is designed for operation with tip speeds from 14,000 fpm to 19,000 fpm with a nominal tip speed of 16,500 fpm. The described said portion 51 functions to maximize air flow (and entrained grass clippings), while minimizing generated noise and parasitic power losses. The grass clipping suspension and transport accomplished by the disclosed cutter blade 23 is essentially pneumatic, with little or no impingement by the sail portion 51 against the grass clippings so as to impart momentum directly to the grass clippings.

Since the airstream does not impinge upon the housing wall or skirt 25 within the cylinder swept by the cutter blade 23, the airstram is not sheared by the cutter blade 23. Hence, neither the power losses, nor the noise generated by shearing the airstream with a conventional cutter blade are experienced when using the disclosed cutter blade 23.

Thus, the disclosed cutter blade construction provides a reduction in noise, together with an improvement in available mowing power, and an improvement in grass catching and discharge by reason of improved airflow. In addition, erosion of the housing wall or skirt by airborne abrasive particles is reduced.

Various of the features of the invention are set forth in the following claims.

I claim:

1. A cutter blade for a rotary lawn mower, said cutter blade being generally of elongated rectangular outline and including a leading edge, a trailing edge, a longitudinal axis extending lengthwise between said leading and trailing edges, a generally planar outer end portion including a cutting edge forming a part of said leading edge and an outer tip which travels at a speed between 14,000 fpm and 19,000 fpm when rotated by the lawn mower, and a sail portion extending from said outer end portion along a form line extending from said outer tip to said trailing edge at a form angle within the range of 25 degrees to 35 degrees to said longitudinal axis, said sail portion having an upper edge spaced above a horizontal plane including said cutting edge at a height of between 0.65 inches and 0.75 inches, and said sail portion extending continuously concavely arcuately outwardly and upwardly from said form line.

2. A cutter blade in accordance with claim 1 wherein said form angle is 30 degrees.

3. A cutter blade in accordance with claim 1 wherein said sail portion extends concavely arcuately outwardly and upwardly from said form line at a uniform radius measured in a plane perpendicular to said form line.

4. A cutter blade in accordance with claim 3 wherein said radius is between 1.00 inches and 1.40 inches.

5. A cutter blade in accordance with claim 4 wherein said radius is 1.20 inches.

6. A cutter blade in accordance with claim 1 wherein said sail portion has a chord length of between 2.20 inches and 3.00 inches measured in a plane perpendicular to said longitudinal axis and from said leading edge to said sail upper edge.

7. A cutter blade in accordance with claim 1 wherein said sail portion has an angle of attack of between 13 degrees and 18 degrees measured in a plane perpendicular to said longitudinal axis and between a horizontal line and a line extending from the said cutting edge to said sail upper edge.

8. A cutter blade for a rotary lawn mower, said cutter blade being generally of elongated rectangular outline and including a leading edge, a trailing edge, a longitudinal axis extending lengthwise between said leading and trailing edges, a generally planar outer end portion including a cutting edge forming a part of said leading edge, and an outer tip which travels at a speed between 14,000 fpm and 19,000 fpm when rotated by the lawn mower, and a sail portion extending from said outer end portion along a form line extending from said outer tip to said trailing edge at a form angle within the range of 25 degrees to 35 degrees to said longitudinal axis, said sail portion having an upper edge spaced above a horizontal plane containing said cutting edge at a height of between 0.65 inches and 0.75 inches and said sail portion extending continuously concavely arcuately outwardly and upwardly from said form line at a uniform radius between 1.00 inches and 1.40 inches measured in a plane perpendicular to said form line, and said sail portion also having a chord length of between 2.20 inches and 3.00 inches measured in a plane perpendicular to said longitudinal axis and from said cutting edge to said sail upper edge, and having an angle of attack of between 13 degrees and 18 degrees measured in a plane perpendicular to said longitudinal axis and between a horizontal line and a line extending from said cutting edge to said sail upper edge.

9. A cutter blade for a rotary lawn mower, said cutter blade being generally of elongated rectangular outline and including a leading edge, a trailing edge, a longitudinal axis extending lengthwise between said leading and trailing edges, a generally planar outer end portion including a cutting edge forming a part of said leading edge, and an outer tip which travels at a speed between 14,000 fpm and 19,000 fpm when rotated by the lawn mower, and a sail portion extending from said outer end portion along a form line extending in the plane of said outer end portion from said outer tip to said trailing edge at a form angle of 30 degrees to said longitudinal axis, said sail portion having an upper edge spaced above a horizontal plane containing said cutting edge at a height of 0.70 inches and extending continuously concavely arcuately outwardly and upwardly from said form line at a uniform radius of 1.20 inches measured in a plane perpendicular to said form line, said sail portion having a chord length of between 2.20 inches and 3.00 inches measured in a plane perpendicular to said longitudinal axis and from said cutting edge to said sail upper edge and having an angle of attack of between 13 degrees and 18 degrees measured in a plane perpendicular to said longitudinal axis and between a horizontal line and a line extending from said cutting edge to said sail upper edge.

10. A rotary lawn mower comprising a housing supported for travel over the ground and including a top deck and a depending skirt, an engine mounted on said top deck and including an output shaft extending veritcally downwardly through said top deck, and a cutter blade located within said housing and driven by said output shaft, said cutter blade being generally of elongated rectangular outline and including a leading edge, a trailing edge, a longitudinal axis extending lengthwise between said leading and trailing edges, a generally planar outer end portion including a cutting edge forming a part of said leading edge, and an outer tip which travels at a speed between 14,000 fpm and 19,000 fpm, and a sail portion extending from said outer end portion along a form line extending from said outer tip to said trailing edge at a form angle within the range of 25 degrees to 35 degrees to said longitudinal axis, said sail portion having an upper edge spaced above a horizontal plane including said cutting edge at a height of between 0.65 inches and 0.75 inches and extending continuously concavely arcuately outwardly and upwardly from said form line.

11. A rotary lawn mower in accordance with claim 10 wherein said form angle is 30 degrees.

12. A rotary lawn mower in accordance with claim 10 wherein said sail portion extends concavely arcuately outwardly and upwardly from said form line at a uniform radius measured in a plane perpendicular to said form line.

13. A rotary lawn mower in accordance with claim 12 wherein said radius is between 1.00 inches and 1.40 inches.

14. A rotary lawn mower in accordance with claim 13 wherein said radius is 1.20 inches.

15. A rotary lawn mower in accordance with claim 10 wherein said sail portion has a chord length of between 2.20 inches and 3.00 inches measured in a plane perpendicular to said longitudinal axis and from said cutting edge to said sail upper edge.

16. A rotary lawn mower in accordance with claim 10 wherein said sail portion has an angle of attack of between 13 degrees and 18 degrees measured in a plane perpendicular to said longitudinal axis and between a horizontal line and a line extending from the said cutting edge to said sail upper edge.

17. A rotary lawn mower comprising a housing supported for travel over the ground and including a top deck and a depending skirt, an engine mounted on said top deck and including an output shaft extending vertically downwardly through said top deck, and a cutter blade located within said housing and driven by said output shaft, said cutter blade being generally of elongated rectangular outline and including a leading edge, a trailing edge, a longitudinal axis extending lengthwise between said leading and trailing edges, a generally planar outer end portion including a cutting edge forming a part of said leading edge and an outer tip which travels at a speed between 14,000 fpm and 19,000 fpm, and a sail portion extending from said outer end portion along a form line extending from said outer tip to said trailing edge at a form angle within the range of 25 degrees to 35 degrees to said longitudinal axis, said sail portion having an upper edge spaced above a horizontal plane including said cutting edge at a height of between 0.65 inches and 0.75 inches and extending continuously concavely arcuately outwardly and upwardly from said form line at a uniform radius between 1.00 inches and 1.40 inches measured in a plane perpendicular to said form line, and said sail portion also having a chord length of between 2.20 inches and 3.00 inches measured in a plane perpendicular to said longitudinal axis and from said cutting edge to said sail upper edge and having an angle of attack of between 13 degrees and 18 degrees measured in a plane perpendicular to said longitudinal axis and between a horizontal line and a line extending from said cutting edge to said sail upper edge.

18. A rotary lawn mower comprising a housing supported for travel over the ground and including a top deck and a depending skirt, an engine mounted on said top deck and including an output shaft extending vertically downwardly through said top deck, and a cutter blade located within said housing and driven by said output shaft, said cutter blade being generally of elongated rectangular outline and including a leading edge, a trailing edge, a longitudinal axis extending lengthwise between said leading and trailing edges, a generally planar outer end portion including a cutting edge forming a part of said leading edge and an outer tip which travels at a speed between 14,000 fpm and 19,000 fpm, and a sail portion extending from said outer end portion along a form line extending in the plane of said outer end portion from said outer tip to said trailing edge at a form angle of 30 degrees to said longitudinal axis, said sail portion having an upper edge spaced above a horizontal plane including said cutting edge at a height of 0.70 inches and extending continuously concavely arcuately outwardly and upwardly from said form line at a uniform radius of 1.20 inches measured in a plane perpendicular to said form line, said sail portion having a chord length of between 2.20 inches and 3.00 inches measured in a plane perpendicular to said longitudinal axis and from said cutting edge to said sail upper edge and having an angle of attack of between 13 degrees and 18 degrees measured in a plane perpendicular to said longitudinal axis and between a horizontal line and a line extending from the said cutting edge to said sail upper edge.

*19. A cutter blade for a rotary lawn mower, said cutter blade being generally of elongated rectangular outline and including a leading edge, a trailing edge, a longitudinal axis extending lengthwise between said leading and trailing edges, a generally planar outer end portion including a cutting edge forming a part of said leading edge and an outer tip which travels at a speed between 14,000 fpm and 19,000 fpm when rotated by the lawn mower, and a sail portion extending from said outer end portion along a form line extending from said outer tip to said trailing edge at a form angle within the range of 25 degrees to 35 degrees to said longitudinal axis, said sail portion having an upper edge spaced above a horizontal plane including said cutting edge at a height of at least 0.65 inches, and said sail portion extending continuously concavely arcuately outwardly and upwardly from said form line.*

*20. A cutter blade in accordance with claim 19 wherein said form angle is 30 degrees.*

*21. A cutter blade in accordance with claim 19 wherein said sail portion extends concavely arcuately outwardly and upwardly from said form line at a uniform radius measured in a plane perpendicular to said form line.*

*22. A cutter blade in accordance with claim 21 wherein said radius is between 1.00 inches and 1.40 inches.*

*23. A cutter blade in accordance with claim 22 wherein said radius is 1.20 inches.*

*24. A cutter blade in accordance with claim 19 wherein said sail portion has a chord length of between 2.20 inches and 3.00 inches measured in a plane perpendicular to said longitudinal axis and from said leading edge to said sail upper edge.*

*25. A cutter blade in accordance with claim 19 wherein said sail portion has an angle of attack of between 13 degrees and 18 degrees measured in a plane perpendicular to said longitudinal axis and between a horizontal line and a line extending from said cutting edge to said sail upper edge.*

*26. A rotary lawn mower comprising a housing supported for travel over the ground and including a top deck and a depending skirt, an engine mounted on said top deck and including an output shaft extending vertically downwardly through said top deck, and a cutter blade located within said housing and driven by said output shaft, said cutter blade being generally of elongated rectangular outline and including a leading edge, a trailing edge, a longitudinal axis extending lengthwise between said leading and trailing edges, a generally planar outer end portion including a cutting edge forming a part of said leading edge, and an outer tip which travels at a speed between 14,000 fpm and 19,000 fpm, and a sail portion extending from said outer end portion along a form line extending from said outer tip to said trailing edge at a form angle within the range of 25 degrees to 35 degrees to said longitudinal axis, said sail portion having an upper edge spaced above a horizontal plane including said cutting edge at a height of at least 0.65 inches and extending continuously concavely arcuately outwardly and upwardly from said form line.*

*27. A rotary lawn mower in accordance with claim 26 wherein said form angle is 30 degrees.*

*28. A rotary lawn mower in accordance with claim 26 wherein said sail portion extends concavely arcuately outwardly and upwardly from said form line at a uniform radius measured in a plane perpendicular to said form line.*

*29. A rotary lawn mower in accordance with claim 28 wherein said radius is between 1.00 inches and 1.40 inches.*

*30. A rotary lawn mower in accordance with claim 29 wherein said radius is 1.20 inches.*

*31. A rotary lawn mower in accordance with claim 26 wherein said sail portion has a chord length of between 2.20 inches and 3.0 inches measured in a plane perpendicular to said longitudinal axis and from said cutting edge to said sail upper edge.*

*32. A rotary lawn mower in accordance with claim 26 wherein said sail portion has an angle of attack of between 13 degrees and 18 degrees measured in a plane perpendicular to said longitudinal axis and between a horizontal line and a line extending from said cutting edge to said sail upper edge.*

* * * * *